（12） United States Patent
Funke et al.

(10) Patent No.: US 7,775,043 B2
(45) Date of Patent: Aug. 17, 2010

(54) TURBOCHARGER CONTROL SYSTEM (75) Inventors: Steven J. Funke, Mapleton, IL (US);
James H. Mutti, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 483 days.

(21) Appl. No.: 11/806,479

(22) Filed: May 31, 2007

(65) Prior Publication Data

US 2007/0289302 A1 Dec. 20, 2007

(30) Foreign Application Priority Data

May 31, 2006 (CN) ........................ 2006 1 0091506

(51) Int. Cl.
F02D 23/00 (2006.01)
F02B 33/44 (2006.01)
F02B 37/18 (2006.01)

(52) U.S. Cl. .......................................... 60/602; 60/612

(58) Field of Classification Search ........... 60/600–603, 60/605.1, 605.2, 612; 701/103, 114
See application file for complete search history.

(56) References Cited

U.S. PATENT DOCUMENTS

| 3,576,102 | A | | 4/1971 | West ........................... 60/612 |
| 4,005,579 | A | | 2/1977 | Lloyd .......................... 60/602 |
| 4,169,355 | A | | 10/1979 | Walsham ...................... 60/602 |
| 4,211,081 | A | | 7/1980 | Yamada ........................ 60/602 |
| 4,368,705 | A | | 1/1983 | Stevenson et al. ........... 123/357 |
| 4,679,398 | A | | 7/1987 | Nishiguchi ................... 60/602 |
| 4,697,421 | A | | 10/1987 | Otobe .......................... 60/602 |
| 4,817,387 | A | * | 4/1989 | Lashbrook .................... 60/600 |
| 4,848,086 | A | | 7/1989 | Inoue ........................... 60/602 |
| 5,033,268 | A | | 7/1991 | Hitomi ....................... 60/605.1 |
| 5,063,744 | A | | 11/1991 | Ishiyama ...................... 60/600 |
| 5,090,202 | A | | 2/1992 | Hitomi ......................... 60/602 |
| 5,121,604 | A | | 6/1992 | Berger |
| 5,123,246 | A | | 6/1992 | Younessi |
| 5,140,817 | A | | 8/1992 | Matsuda |
| 5,155,998 | A | | 10/1992 | Monden |
| 5,174,119 | A | | 12/1992 | Hanauer |
| 5,199,261 | A | | 4/1993 | Baker |
| 5,224,853 | A | | 7/1993 | Kazuo et al. .................. 60/602 |
| 5,447,031 | A | * | 9/1995 | Betts et al. ................... 60/603 |
| 5,551,236 | A | | 9/1996 | Zimmer et al. ............... 60/611 |
| 5,829,254 | A | * | 11/1998 | Hayashi et al. .............. 60/602 |
| 5,850,738 | A | * | 12/1998 | Hayashi ....................... 60/602 |
| 5,873,248 | A | | 2/1999 | Houtz .......................... 60/602 |
| 5,974,801 | A | * | 11/1999 | Houtz .......................... 60/602 |

(Continued)

FOREIGN PATENT DOCUMENTS

JP 2-163419 6/1990

*Primary Examiner*—Thai Ba Trieu
(74) *Attorney, Agent, or Firm*—Finnegan, Henderson, Farabow, Garrett & Dunner LLC (57) ABSTRACT

A system for controlling boost pressure at various different altitudes of operation of a turbo charged internal combustion engine includes a wastegate valve, an actuator, and a controller. Signals delivered from an engine speed sensor, a boost pressure transducer, a barometric pressure sensor, and a turbocharger speed sensor are processed in the controller. A control signal delivered from the controller to the actuator controls the position of the wastegate valve, bypass of exhaust gasses, and the speed of the turbocharger. The controller is configured to compare the turbocharger speed to a predetermined threshold value and determine the control signal based on the comparison.

5 Claims, 6 Drawing Sheets

U.S. PATENT DOCUMENTS

| | | | |
|---|---|---|---|
| 6,224,021 B1 * | 5/2001 | Tanaka ........................ | 244/221 |
| 6,256,992 B1 * | 7/2001 | Lewis et al. ................... | 60/603 |
| 6,378,306 B2 * | 4/2002 | Koelle et al. ................ | 60/605.1 |
| 6,687,601 B2 * | 2/2004 | Bale et al. ..................... | 60/602 |
| 6,718,251 B2 * | 4/2004 | Brackney et al. ............ | 701/103 |
| 6,804,601 B2 * | 10/2004 | Wang et al. ................... | 60/602 |
| 7,231,760 B2 * | 6/2007 | Busch ....................... | 60/605.1 |
| 7,480,559 B2 * | 1/2009 | Groer ......................... | 701/114 |
| 2006/0288702 A1 * | 12/2006 | Gokhale et al. ............... | 60/602 |
| 2009/0094978 A1 * | 4/2009 | Yamagata et al. ............. | 60/602 |

\* cited by examiner

TURBOCHARGER CONTROL SYSTEM

TECHNICAL FIELD

This disclosure relates to a turbocharger control system and more particularly to a control system for controlling the amount of air delivered by turbocharger to an internal combustion engine at different altitudes of engine operation.

BACKGROUND

Turbocharged engines of the type used primarily in off highway trucks often have a pneumatically actuated wastegate valve for controlling the turbocharger speed and thus the boost pressure delivered to the intake manifold of the engine. The wastegate valve is normally disposed in the exhaust system of the engine and controls the speed of the turbocharger by modifying the volume of exhaust gasses directed to the turbine section of the turbocharger.

U.S. Pat. No. 4,697,421 dated Oct. 6, 1987 to Yutaka Otobe et. al. discloses a wastegate valve for bypassing engine exhaust flow from the turbine section and thereby control boost pressure. The wastegate valve is moved by a pneumatic actuator controlled by a control valve which varies the wastegate valve opening pressure based on boost pressure and intake manifold temperature. Maintaining the boost pressure at a target pressure may improve engine operating conditions and reduce engine knock at a given altitude. However, since there is no compensation for operating at different altitudes, the loss of boost at high altitudes and over boost at lower altitudes and ambient temperatures may occur. Therefore optimum operation of the engine is not achieved.

Wastegate valves have been successful in protecting the engine from excessive boost (peak cylinder pressure) at low altitudes (ambient temperatures) but have not been successfully used in situations where precision modulation of the wastegate valve is required. State of the art fluid operated wastegate control systems lack the responsiveness and accuracy required for good modulation. Therefore, in order to provide a higher degree of optimization of wastegate valve operation a more responsive and accurate control system must be provided.

In order to optimize wastegate control, maintain lower exhaust temperatures, and provide the right amount of boost at various air densities (different altitudes and different ambient air temperatures), it is necessary to provide a control system which considers various related control parameters. At present such a control system has not been provided.

SUMMARY OF THE INVENTION

A control system for controlling the turbocharger boost pressure of an internal combustion engine at various different altitudes is provided. The engine has an intake manifold and an exhaust manifold respectively connected to a compressor section and a turbine section of a turbocharger. A wastegate valve connected between the exhaust manifold and the turbine section is movable between an open position at which fluid flow exhausted by the engine is free to bypass the turbine and a closed position at which fluid flow exhausted by the engine is restricted from bypassing the turbine. A first sensor senses the speed of the engine and delivers a responsive speed signal. A second sensor senses a boost pressure of the engine and delivers a responsive boost signal. A third sensor senses a rack position of the engine and delivers a responsive rack position signal. A fourth sensor senses a barometric pressure and delivers a responsive barometric pressure signal. A fifth sensor senses a speed of the turbocharger and delivers a responsive turbocharger speed signal. A controller connected to the first, second, third, and fourth sensors receives the speed, boost, rack position and barometric pressure signals, determines a boost error based on the speed, boost, rack position and barometric pressure signals, and delivers a responsive control signal. The controller is configured to compare the turbocharger speed to a predetermined threshold value and determine the control signal based on the comparison. An actuator receives the control signal, responsively moves the wastegate valve toward one of the open and closed positions, and changes the amount of boost delivered from the turbocharger to the intake manifold of the engine.

DETAILED DESCRIPTION

Figure 1:
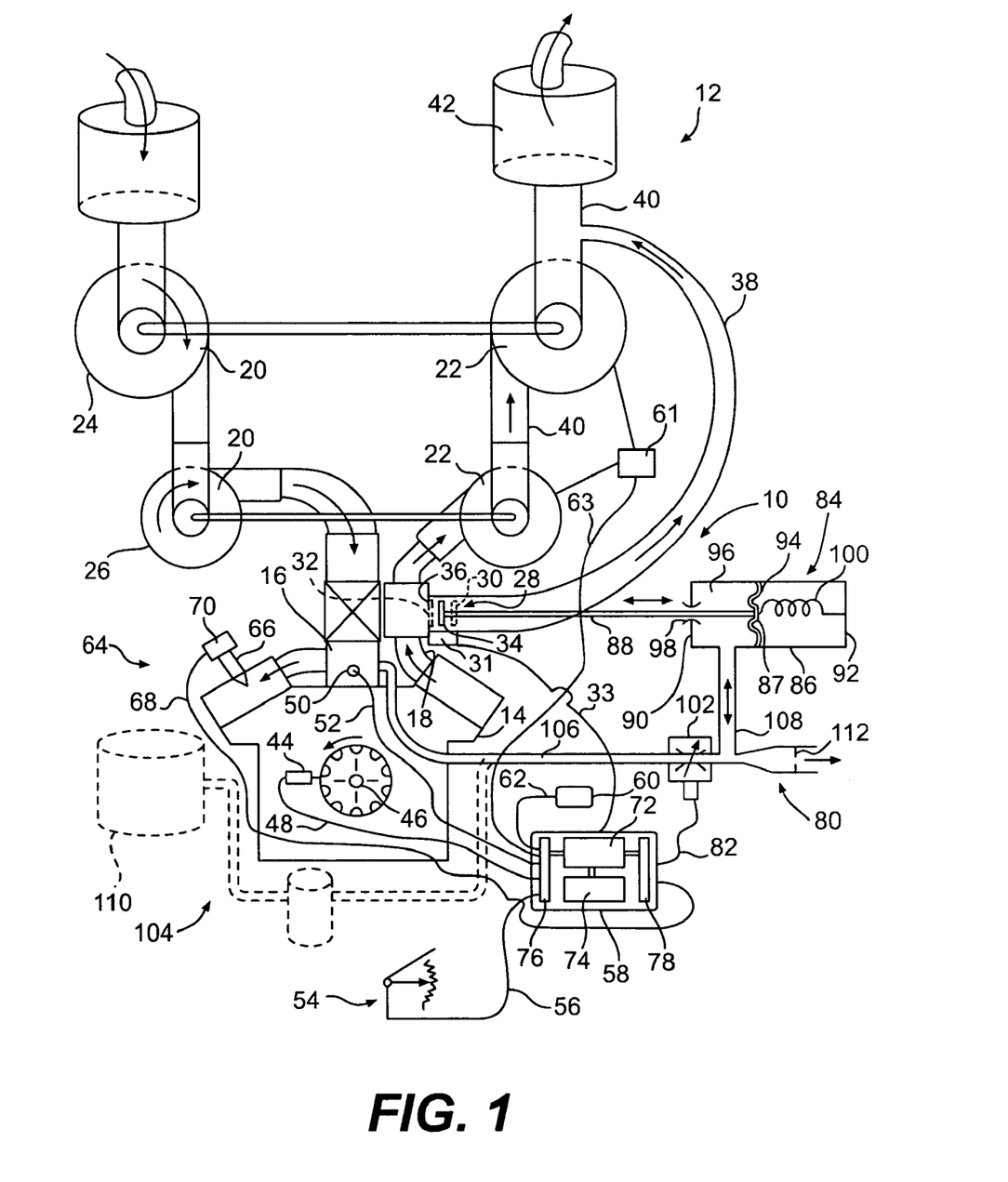
FIG. 1 is a schematic drawing of an exemplary embodiment showing a turbo charged internal combustion engine, a wastegate valve, and a control system for controlling the wastegate valve.

With reference to the drawings and particularly FIG. 1, a control system 10 for controlling the boost pressure of a turbocharger 12 of an internal combustion engine 14, for example a diesel engine, at various different altitudes is shown. The engine 14 has an intake manifold 16 and an exhaust manifold 18 respectively connected to compressor 20 and turbine 22 sections of the turbocharger 12. The turbocharger 12 of the specific embodiment consists of two turbochargers connected in series, a low pressure turbocharger 24 and a high pressure turbocharger 26 each having a compressor 20 and turbine 22 section. As is well known in the art, in order to cover a full range of engine operating requirements, different altitudes and temperatures affect engine boost requirements, two turbochargers are often provided.

A wastegate valve 28 connected between the exhaust manifold 18 and the turbine section 22 is movable between an open position 30 at which fluid flow exhausted by the engine 14 is free to bypass the turbine 22 and a closed position 32 at which fluid flow exhausted by the engine 14 is restricted from bypassing the turbine 22. The wastegate valve 28 bypasses exhaust fluid flow at the open position and at positions between the open 30 and closed 32 positions. Since the wastegate valve is infinitely variable, positions between open and closed determine different bypass characteristics. It is to be noted that at the closed position 32 the wastegate valve 28 may not be fully closed and some of the exhaust gasses may bypass the turbine section 22. Similarly, at the open position the wastegate valve 28 may not be fully open to bypass all of the exhaust gasses. The open and closed positions may be likened to two different orifice sizes with intermediate orifice sizes being provided at locations therebetween.

The wastegate valve 28 is shown as having a linearly movable disc 34 and fixed seat 36, however, other configurations such as butterfly and flapper type valves are equivalents and within the scope of the disclosure. The wastegate valve 28 is disposed in a bypass conduit 38 which is teed into the exhaust ducting 40 between the exhaust manifold 18 and the turbine section 22. The bypass conduit 38 is connected to the exhaust manifold 18 in parallel with the turbine section 22. Exhaust gasses bypassed by the wastegate valve 28 are directed by the bypass conduit to the muffler 42 disposed in the exhaust ducting.

A wastegate sensor means 31 may be used to determine whether the wastegate valve 28 is operating properly. For example, the wastegate sensor means 31 senses the position of the wastegate valve 28 and delivers a responsive signal via a conductor 33 connected between the wastegate valve 28 and the control means 58. The control means 58 may determine whether the wastegate valve 28 is operating properly based on a comparison of the position of the wastegate valve 28 and a control signal used to position the wastegate valve 28.

A first means 44 senses the speed of the crankshaft 46 of the engine 14 and delivers a responsive digital speed signal via a conductor 48. The first means 44 may include any suitable transducer, for example, a magnetic pick-up and an adjacent toothed wheel. The transducer is connected to the engine and the toothed wheel is mounted on the engine crankshaft 46.

A second means 50 senses the boost pressure of the engine and delivers a responsive boost signal via conductor 52. The second means 50 may include a pressure transducer of any suitable commercially available type connected to and disposed into the intake manifold 16. The boost signal is analog and corresponds in magnitude to the boost pressure at the intake manifold.

A third means 54 senses a rack position of the engine and delivers a responsive rack position signal via conductor 56. To those skilled in the art, the term rack when used in conjunction with internal combustion engines having electronically controlled fuel injectors indicates a selected amount of fuel being supplied to the engine. This selected amount of fuel is based on, for example, operator input. The third means 54 may include an operator command input device of the analog or digital type. For example, the position may be based on operator input of a lever or pedal connected to operate a potentiometer or encoder. The analog or digital device establishes the engine power demanded by the vehicle operator and commands a control means 58 to establish engine rack position. It is to be noted that rack position signal may be obtained directly from the control means. This is equivalent and within the spirit of the meaning of third means 54.

A fourth means 60 senses a barometric pressure of the engine environment and delivers a responsive barometric pressure signal of either the analog or digital type via conductor 62. The fourth means 60 may include any suitable commercially available barometric pressure sensor. As is known by those skilled in the art, barometric pressure varies with altitude is thus proportional thereto. The barometric pressure signal may be converted to altitude for reasons of processing.

A fifth means 61 senses a speed of the turbocharger 12 and delivers a responsive turbocharger speed signal via conductor 63. The fifth means 61 may include one or more suitable speed sensors connected to the turbocharger 12. Alternatively, the fifth means 61 may include one or more virtual sensors to generate a turbocharger speed value based on values of input parameters sensed by one or more physical sensors.

A fuel injecting system 64, including a plurality of fuel injectors 66 (only one shown) of any suitable construction, distributes fuel to power the engine 14. The fuel injecting system 66 is connected to the control means 58 via conductor 68 and under electronic control thereof. The fuel injectors 66 are preferably controlled by commercially available electro-hydraulic valves 70 (only one shown) which respond to signals delivered by the control means 58. The injectors deliver fuel to the engine based on control signals from the control means 58.

The control means 58 is connected to the first, second, third, fourth, and fifth sensing means 44, 50, 54, 60, and 61 via conductors 48, 52, 56, 62, and 63 for receiving the engine speed, boost, rack position, and barometric pressure or turbocharger speed signals. The control means 58 includes a processor 72, a memory 74, an analog to digital converter 76 for converting analog signals, if required, and a driver 78 for driving an actuator means 80. The control means 58 is responsive to these control signals for determining a boost error based on the speed, boost, rack position, and barometric pressure or turbocharger speed signals and delivering a responsive control signal.

The actuator means 80 receives the control signal via conductor 82 connected between the control and actuator means 80 means and responsively moves the wastegate valve 28 toward one of the open and closed positions and thereby changes the amount of boost delivered from the turbocharger 12 to the intake manifold 16 of the engine 14.

Figure 2:
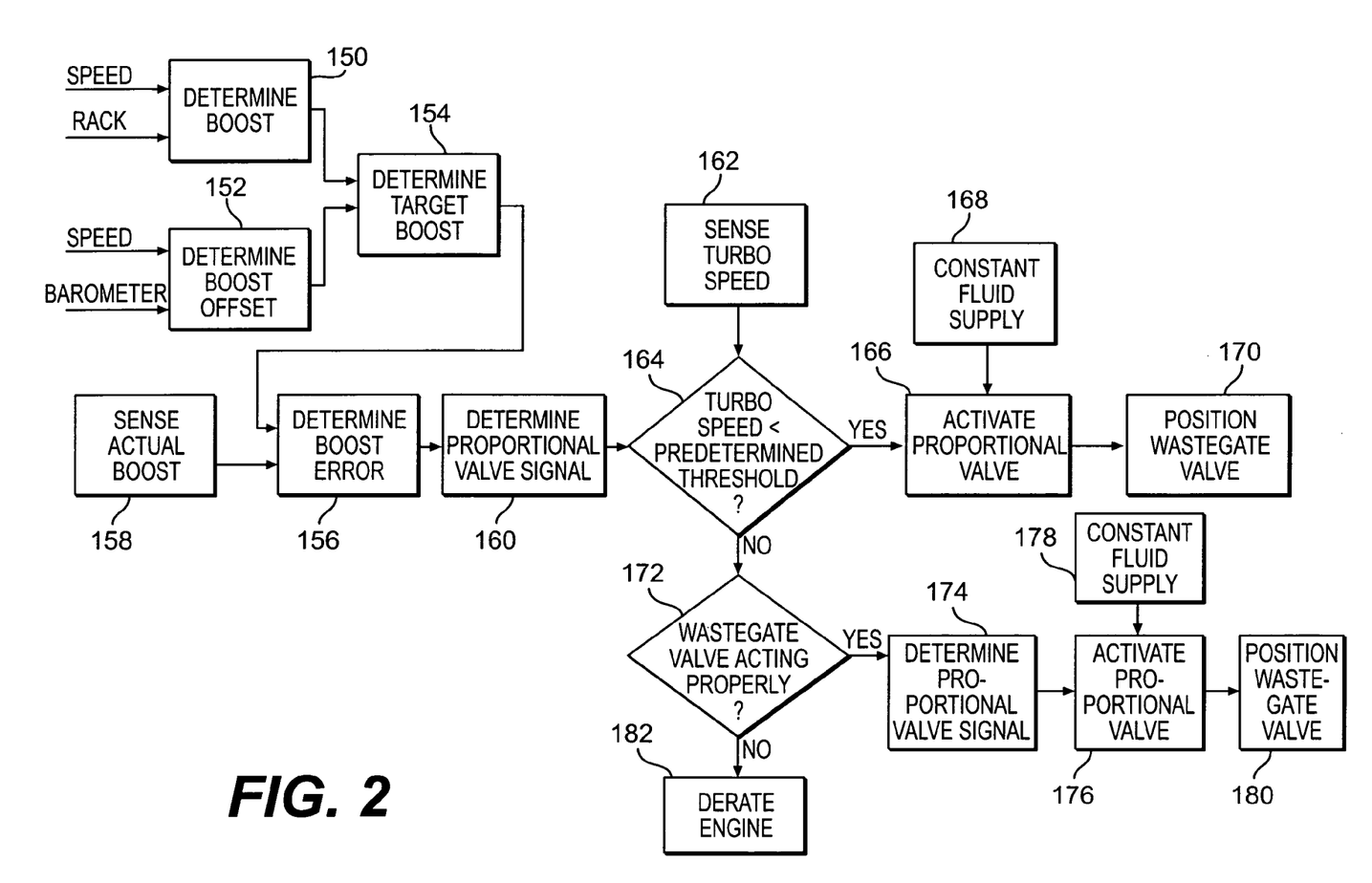
FIG. 2 is a flow chart showing the control system control logic according to an exemplary embodiment.

As best seen in FIG. 2, the logic for controlling the wastegate valve 28 is show in substantial detail. The processor 72 determines boost, for example, by selecting a boost value from a boost map 150 (or lookup table) based on the engine speed and rack position signals.

The processor 72 determines a boost offset, for example, by selecting a boost offset value from a boost offset map 152 (or lookup table) based on engine speed and barometric pressure. It should be recognized that the processor may convert barometric pressure to altitude. In such cases the boost offset map is based on speed and altitude.

The processor combines the boost offset and boost values in box 154 and to obtain a target boost value. The boost error in box 156 is determined as a difference between actual and target boost values ($Boost_{actual} - Boost_{target} = Boost_{error}$). The actual boost, box 158, is the boost being sensed by the second means 50 and delivered to the processor 72. Additional information related to the logic of wastegate valve control will be subsequently discussed.

Figure 3:
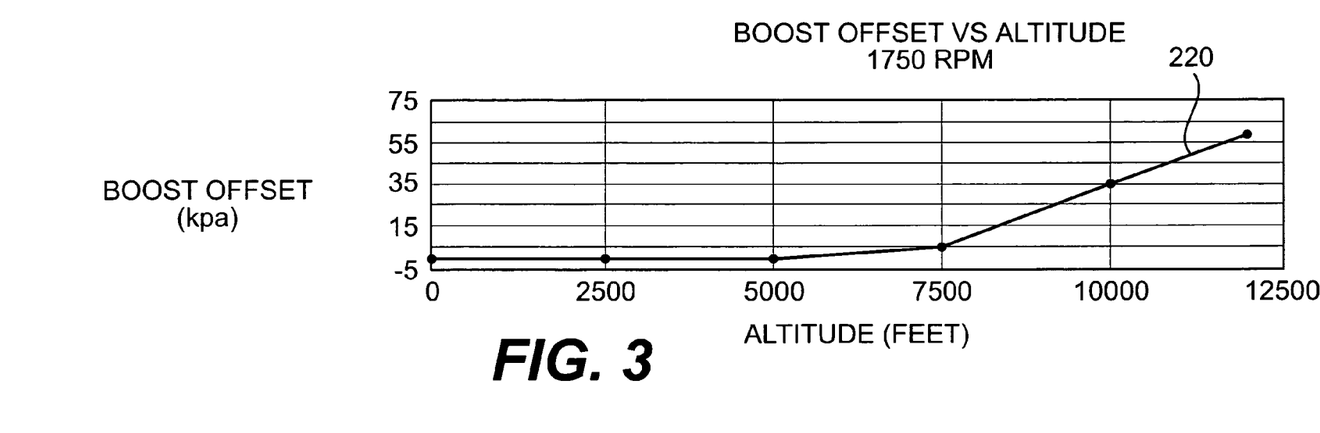
FIG. 3 is a graph showing Boost Offset vs. Altitude at an engine speed of 1750 rpm.

As shown in FIG. 3, the boost offset value at 1,750 rpm, as shown by curve 220, varies with altitude between approximately −5 and 65 kpa. From an examination of the curve 220, and as one may expect, the change in boost offset is greatest between 5,000 and 12,500 ft. A family of separate boost offset curves exist for the other engine speeds. The boost offset value in box 152, FIG. 2, is selected from a boost offset map, look-up table, or the like for the sensed engine speed and barometric pressure.

Figure 7:
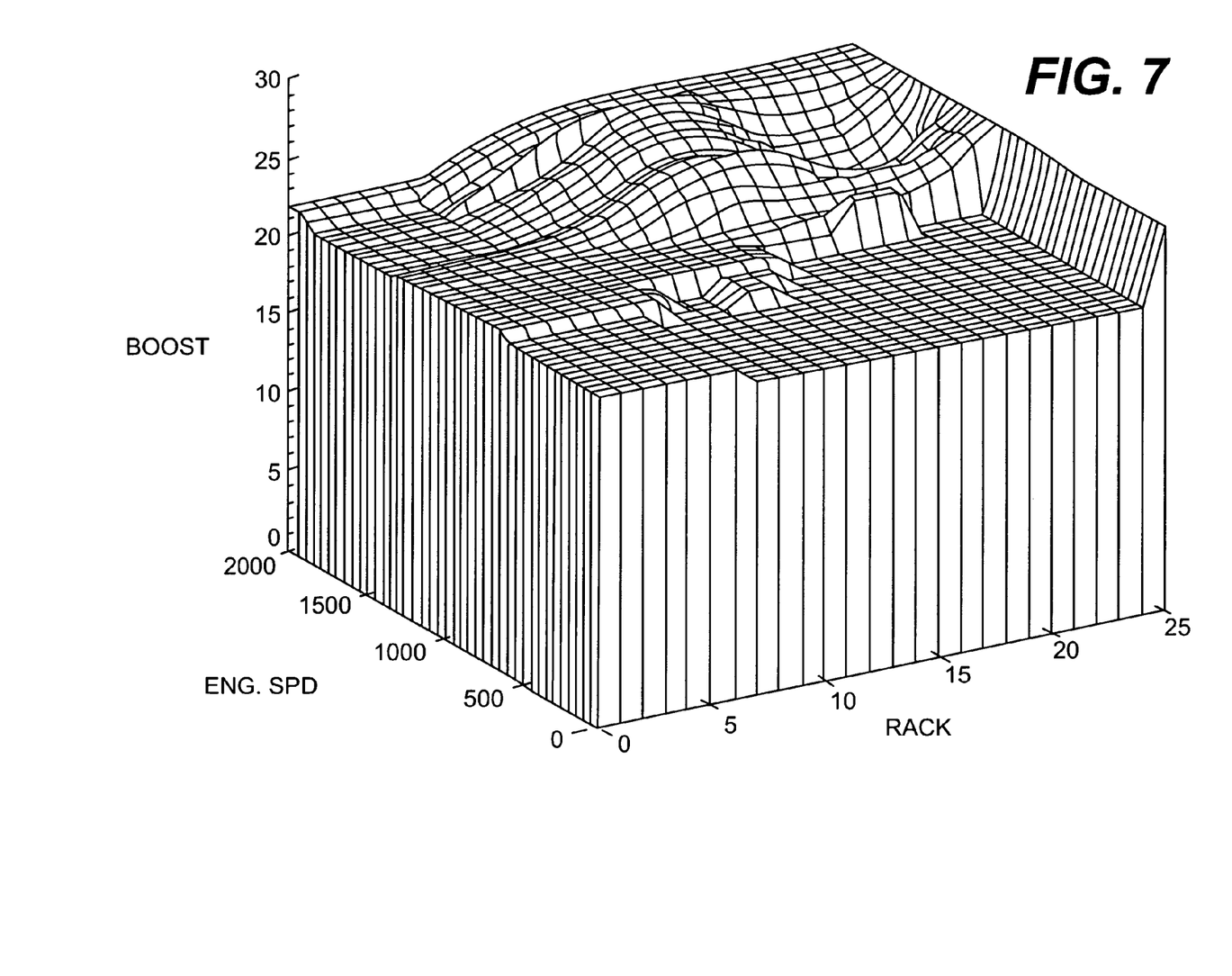
FIG. 7 is a three dimensional Boost Map with boost, engine speed and rack position as the coordinates.

Referring to FIG. 7, a three dimensional boost map is shown in substantial detail. The boost value for a particular engine speed and rack position may be easily determined. As indicated in box 150, the boost value for a sensed engine speed and rack position is determined, such as from a boost map, look-up table and the like. This boost value is subsequently used in the determination of target boost.

Figure 4:
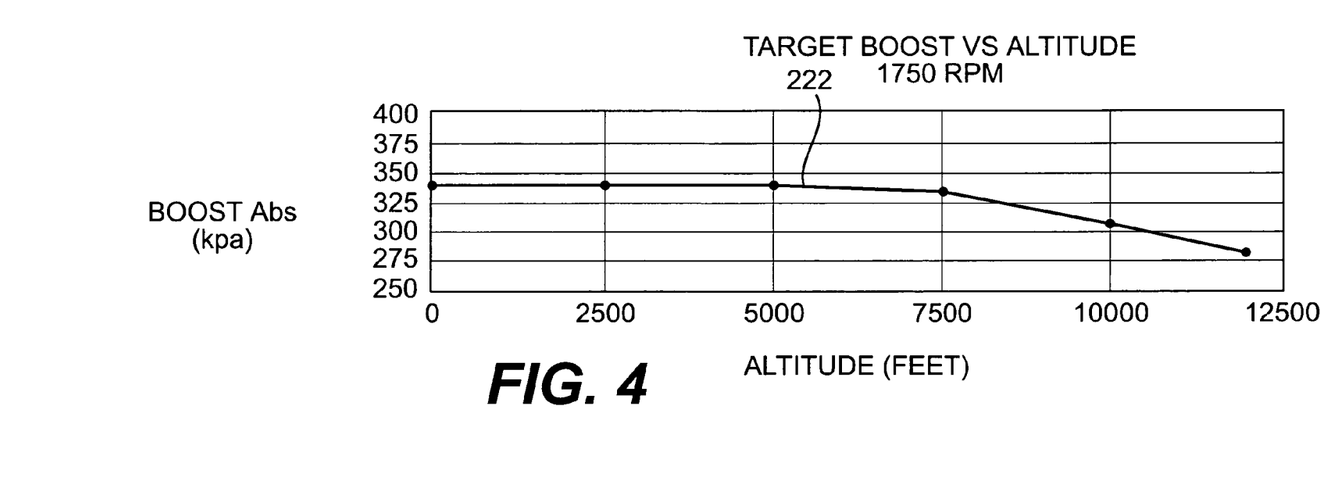
FIG. 4 is a graph showing Target Boost vs. Altitude at an engine speed of 1750 rpm.

As shown in FIG. 4, the target boost value at 1,750 rpm, as shown by curve 222, varies with altitude between approximately 275-350 kpa. From an examination of the curve 222, and as one may expect, the change in boost offset is greatest between 5,000 and 12,500 ft. A family of separate target boost curves exist for the other engine speeds. The target boost value in box 154, FIG. 2, is selected from a target boost map, look-up table, or the like based on the boost and offset boost determined in boxes 150 and 152, respectively.

Figure 5:
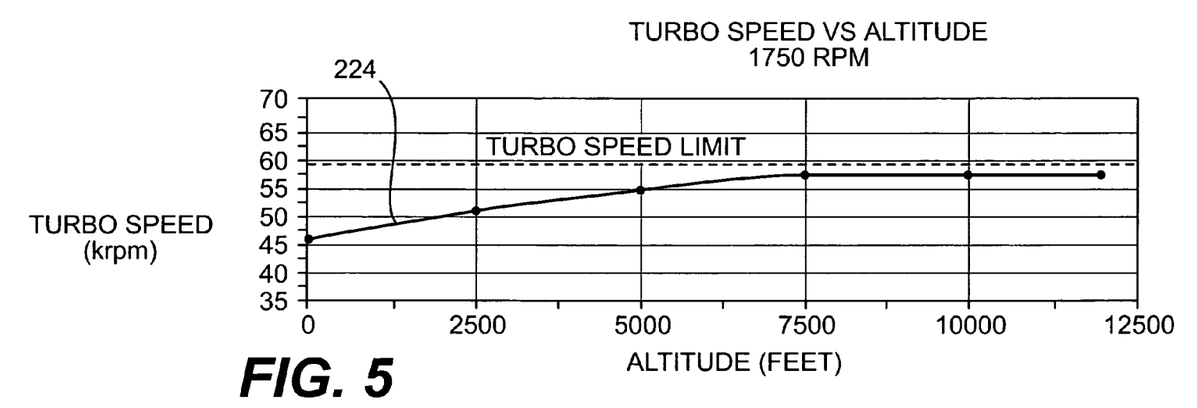
FIG. 5 is a graph showing Turbo Speed vs. Altitude at an engine speed of 1750 rpm.
Figure 6:
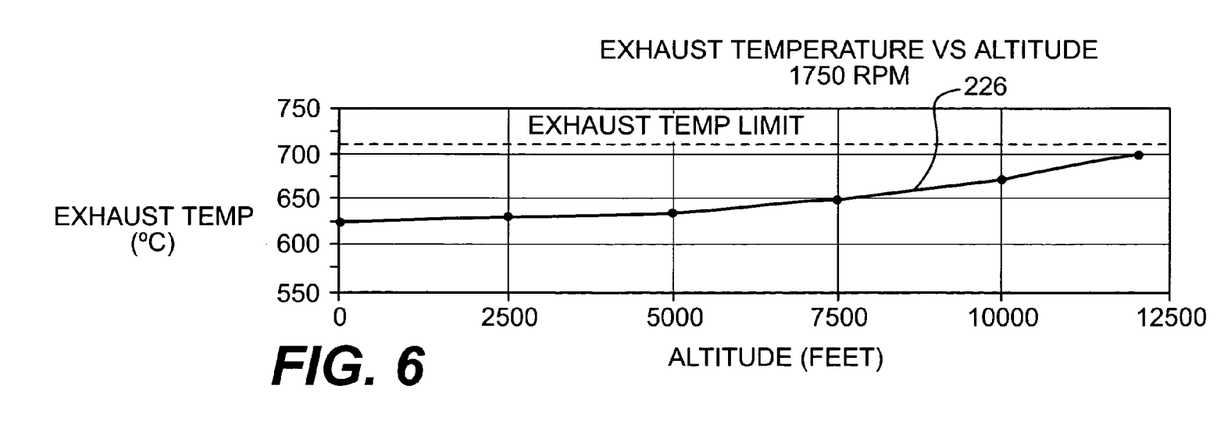
FIG. 6 is a graph showing Exhaust Temperature vs. Altitude at an engine speed of 1750 rpm.

As shown in the graphs of FIGS. 5 and 6, turbocharger speed and engine exhaust temperature, are each plotted with respect to altitude. As can be seen in FIG. 5, at an engine speed of 1,750 rpm, the turbocharger speed curve 224 increases with altitude until about 7,500 ft. Turbocharger speed increases above 7,500 ft are prevented. Similarly, as can been seen in FIG. 6, at an engine speed of 1,750 rpm, the exhaust temperature curve 226 increases with altitude until it nears 12,500 ft. As can be appreciated, limitations to turbocharger speed and engine exhaust temperatures are established to prevent premature wear and damage to the turbocharger and engine. Like discussed above, there is a family of curves related to curves 224, 226 for other engine speeds.

It should be noted that the control means 58 safeguards turbocharger operation by preventing the turbocharger from exceeding speed and temperature limits even when additional boost would increase power.

Referring to FIG. 1, the actuator means includes a linear actuator 84 having a cylindrically tubular housing 86, a piston 87, and rod 88 connected to the piston 87 and wastegate valve 28. The rod 88 is slidably axially movably connected to the housing 86. The housing 86 has first and second ends 90, 92. The linear actuator 84 has a diaphragm 94 connected to the piston rod 88 and the housing 86 at a location between the first and second housing ends 90, 92. The diaphragm 94 is in sealing engagement with the housing 86 and rod 88 and defines a chamber 96 in the housing 86. The first end 90 has an sealed opening 98 of a preselected diameter therein. The rod 88 has a preselected diameter and extends through the opening 98. The diameter of the rod 88 is smaller than the diameter of the sealed opening 98 and defines a predetermined clearance therebetween. The predetermined clearance defines a controlled leakage path between the chamber 96 and the atmosphere. A spring 100 is provided to urge the wastegate valve to a predetermined neutral position. The neutral position is shown as being between the opened 30 and closed 32 positions, however, other positions, such as being at the open and closed may be selected to provide the operating characteristics desired at the neutral position.

The actuator means 80 includes a proportional valve 102. The proportional valve 102 is connected to a source of pressurized fluid flow 104 by a first conduit 106 and to the housing 86 by a second conduit 108. The first conduit 106 delivers pressurized fluid flow from the source 104 to the proportional valve 102 and the second conduit 108 delivers pressurized fluid flow from the proportional valve 102 to the chamber 96. The proportional valve 102 is preferably a solenoid operated proportional air valve of conventional design and is connected to the control means 58 by conductor 82. The proportional valve 102 receives control signals delivered from the control means 58 by way of conductor 82 and responsively modulates the pressurized fluid flow delivered from the source 104 of pressurized fluid flow to the housing 86.

The source of pressurized fluid flow 104 may be either an independent air supply, for example, an air compressor 110. Alternatively, the inlet air provided to the engine 14 may be the source of pressurized fluid flow 104. Conduit 108 connects either the compressor 110 to the proportional valve 102 or the intake manifold 16 to the proportional valve 102.

A fixed orifice 112 of a predetermined size is connected to the second conduit 108 and in a parallel fluid passing relationship with the second conduit 108. The fixed orifice 112 bleeds off a portion of the pressurized fluid flow delivered to the second conduit 108 by the proportional valve 102 and establishes a control flow rate in combination with the pressurized fluid flow passed by the proportional valve 102.

The fluid pressure in second conduit 108 and in the chamber 96 acts on the piston 87 and diaphragm 94 and causes the rod 88 to move relative to the housing 86. This movement of the rod 88 causes the wastegate valve 28 to move between the open and closed positions. The difference between the force caused by fluid pressure acting on the piston 87 and diaphragm 94 and the force of spring 100 determines the location of the rod 87 and the position of the wastegate valve 28. The combination of the orifice 80 and the proportional valve 102 enables accurate positioning of the wastegate valve 28. The control means 58, in delivering a control signal via conduit 82 to the proportional valve 102, establishes a control pressure in chamber 96 and thereby determines the wastegate valve position.

As shown in FIG. 2, the control signal delivered is related to boost error, box 156. As a result, the control signal delivered is used to determine an appropriate proportional valve signal, box 160, for controlling the actuation of the proportional valve 102.

Next, the turbocharger speed is sensed by the fifth means 61 and delivered to the processor 72, box 162. The turbocharger speed is compared to a predetermined threshold value, box 164. As noted above, the turbocharger speed may be the speed of the low pressure turbocharger 24 or the high pressure turbocharger 26. Alternatively, the turbocharger speed may be a value corresponding to the speeds of both turbochargers 24, 26. If the turbocharger speed is less than the predetermined threshold value, then the proportional valve signal determined in box 160 is used to move the proportional valve 102, box 166, an amount which is sufficient to establish a fluid flow rate adequate to move the rod 88 to a position at which an appropriate amount of exhaust flow is bypassed by the wastegate valve 28, box 170. The substantially constant pressure fluid supply 104, box 168, is regulated by the proportional valve 102 to position the wastegate valve 28.

If, however, at box 164, the turbocharger speed is greater than or equal to the predetermined threshold value, then the control means 58 makes a determination whether the wastegate valve 28 is operating properly, box 172. For example, if the control means 58 determines that the turbocharger speed exceeds the predetermined threshold value, the control means 58 may calculate an error value, which is the difference between an actual wastegate valve position and a desired wastegate valve position, or alternatively, the difference between an average actual wastegate valve position and an average desired wastegate valve position over a certain period of time. If the error value exceeds a predetermined error threshold, then the wastegate valve 28 is not operating properly. The wastegate sensor means 31 may be used to determine the actual wastegate valve position, and the desired wastegate valve position may be determined based on the control signal used to position the wastegate valve 28.

If the wastegate valve 28 is operating properly, then an appropriate proportional valve signal is determined, box 174, that is at or below the predetermined threshold value used in box 164. The proportional valve signal is used to move the proportional valve 102, box 176, an amount which is sufficient to establish a fluid flow rate adequate to move the rod 88 to a position at which an appropriate amount of exhaust flow is bypassed by the wastegate valve 28, box 180. The substantially constant pressure fluid supply 104, box 178, is regulated by the proportional valve 102 to position the wastegate valve 28. If, however, at box 172, the wastegate valve 28 is not acting properly, then the control means 58 operates to derate the engine 14, box 182, for example, by decreasing the amount of fuel supplied to the engine 14.

In situations where a large boost increase is required, the control signal delivered to move the proportional valve 102 is of a magnitude greater than when a small boost increase is required. This results in a proportional response time in wastegate valve 28 valve opening. The control signal is preferably an analog signal having a magnitude proportional to the desired position of the proportional valve 102.

Figure 8:
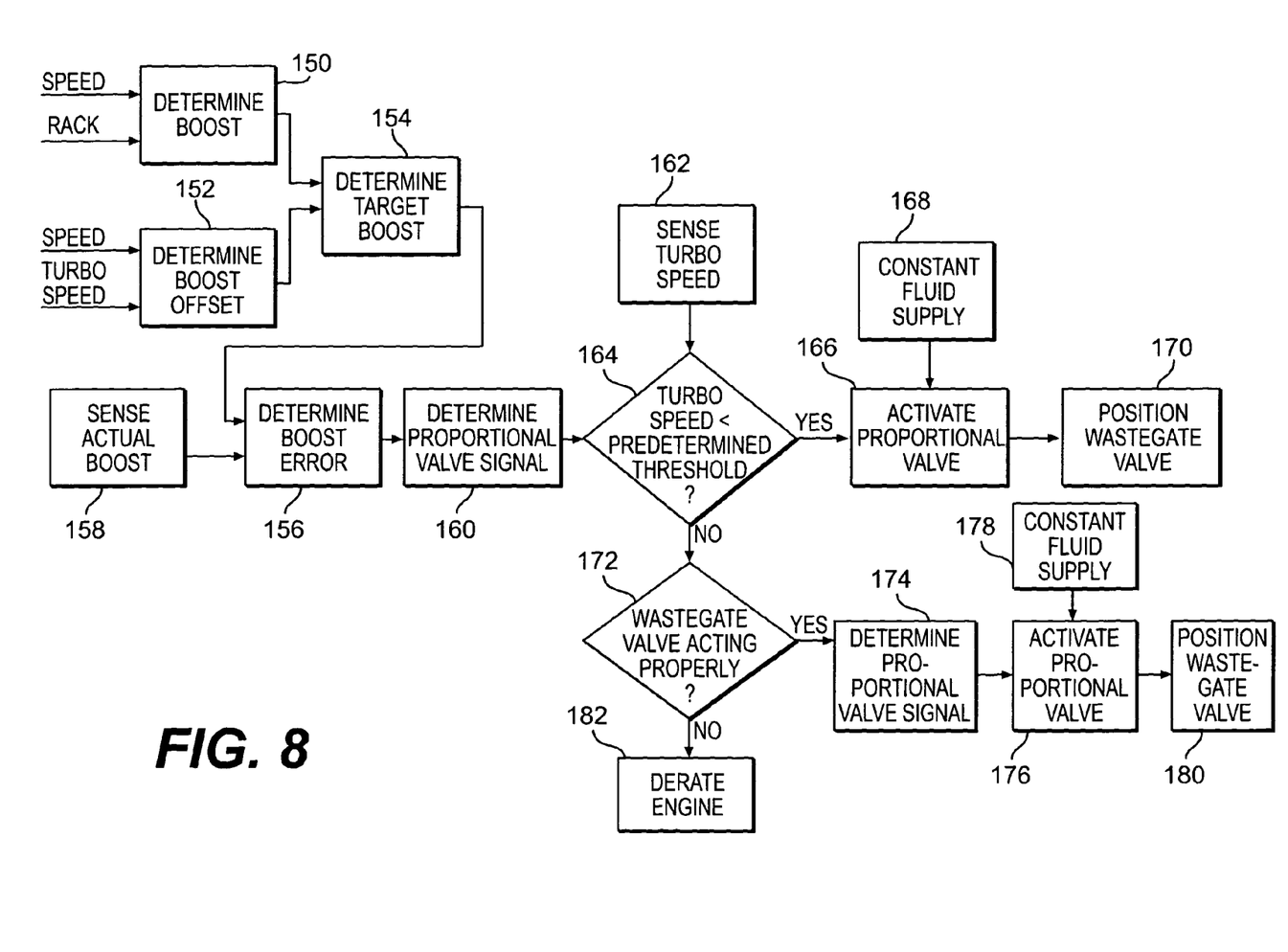
FIG. 8 is a flow chart showing the control system control logic according to another exemplary embodiment.

Alternatively, as shown in FIG. 8, the processor 72 may determine the boost offset by selecting the boost offset value from the boost offset map 152 (or lookup table) based on speed and turbocharger speed, instead of speed and barometric pressure as described above in connection with the embodiment shown in FIG. 2.

INDUSTRIAL APPLICABILITY

The control system 10 optimizes the amount of turbocharger boost provided to the engine 14 at various different altitudes without exceeding temperature and turbocharger speed limits.

The control system, in utilizing barometric pressure (altitude) as one of the control parameters, achieves improved performance of the engine 14 at different altitudes and overcomes the problems associated with insufficient or excessive boost.

In operation, the control system 10 controls intake manifold 16 boost at different altitudes of the turbocharged internal combustion engine 14 by sensing engine speed, boost, rack position, and barometric pressure or turbocharger speed, and controls the wastegate valve 28 based on these signals and in accordance with preprogrammed instructions.

The control means 58 determines the target boost value based on engine speed, rack position, and altitude or turbocharger speed, the boost error between the actual sensed boost value and target boost value, and changes the amount of boost delivered from the turbocharger to the intake manifold in response to the boost error by controlling the wastegate valve 28 position and the bypassing of exhaust gasses.

In determining target boost, the control means 58 selects a boost value from a boost map, a boost offset value from a boost offset map, combines the boost and boost offset values selected, and determines a target boost value from the selected boost and offset boost values. The boost error is determined by reducing the sensed actual boost value by the target boost value.

If the boost error is negative, the control signal delivered from the control means 58 to the proportional valve 102 may cause the proportional valve 102 to reduce fluid flow passed to conduit 108 and thereby bleed fluid from chamber 96 and cause the wastegate valve 28 to move to the closed position. If the bleed error is positive, the control signal delivered from the control means 58 to the proportional valve 102 may cause the proportional valve 102 to increase fluid flow passed to conduit 108 and thereby add fluid to chamber 96 and cause the bleed valve to move toward the open position.

After determination of the boost error and the associated determination of an appropriate proportional valve signal, the turbocharger speed is checked. If the turbocharger speed is below the predetermined threshold, the proportional valve signal is sent to control the proportional valve 102. If, however, the turbocharger speed is above the predetermined threshold, the control means 58 determines whether the wastegate valve 28 is operating properly. If the wastegate valve 28 is operating properly, then a new proportional valve signal, corresponding to the threshold value, is sent to control the proportional valve 102. If the wastegate valve 28 is operating improperly, then the engine 14 is derated.

The aforementioned control of the wastegate valve by the control means 58 and actuator means 80 results in accurate and responsive control of engine boost pressure.

Other aspects, objects and advantages can be obtained from a study of the drawings, the disclosure, and the appended claims.

What is claimed is:

1. A control system for controlling turbocharger boost pressure of an internal combustion engine at various different altitudes, said engine having an intake manifold and an exhaust manifold respectively connected to a compressor section and a turbine section of a turbocharger, comprising:

a wastegate valve connected between said exhaust manifold and said turbine section, said wastegate valve being movable between an open position at which fluid flow exhausted by the engine is free to bypass the turbine and a closed position at which fluid flow exhausted by the engine is restricted from bypassing the turbine;

a first sensor configured to sense a speed of the engine and deliver a responsive speed signal;

a second sensor configured to sense a boost pressure of the engine and deliver a responsive boost signal;

a third sensor configured to sense a rack position of the engine and deliver a responsive rack position signal;

a fourth sensor configured to sense a speed of the turbocharger and deliver a responsive turbocharger speed signal;

a controller connected to said first, second, third, and fourth sensors, the controller being configured to receive the speed, boost, rack position, and turbocharger speed signals, determine a boost error based on actual and target boost values and deliver a responsive control signal;

the controller including a processor, said processor determining the target boost value based on the speed, rack position, and sensed turbocharger speed signals, said processor selecting a boost value from a boost map and a boost offset value from a boost offset map, and combining said selected boost and offset boost values to determine said target boost value, said boost map value being a function of engine speed and rack position and said boost offset value being a function of engine speed and turbocharger speed; and an actuator for receiving said control signal, responsively moving said wastegate valve toward one of the open and closed positions, and to a position between the open and closed positions; and the controller is configured to determine whether said wastegate valve is operating properly; and the controller delivers a signal to derate said engine if the controller determines that said wastegate valve is operating improperly.

2. A control system for controlling turbocharger boost pressure of an internal combustion engine at various different altitudes, said engine having an intake manifold and an exhaust manifold respectively connected to a compressor section and a turbine section of a turbocharger, comprising:

a wastegate valve connected between said exhaust manifold and said turbine section, said wastegate valve being movable between an open position at which fluid flow exhausted by the engine is free to bypass the turbine and a closed position at which fluid flow exhausted by the engine is restricted from bypassing the turbine;

a first sensor configured to sense a speed of the engine and deliver a responsive speed signal;

a second sensor configured to sense a boost pressure of the engine and deliver a responsive boost signal;

a third sensor configured to sense a rack position of the engine and deliver a responsive rack position signal;

a fourth sensor configured to sense a barometric pressure and deliver a responsive barometric pressure signal;

a fifth sensor configured to sense a speed of the turbocharger and deliver a responsive turbocharger speed signal; a controller connected to said first, second, third, fourth, and fifth sensors, the controller being configured to receive said speed, boost, rack position, barometric pressure, and turbocharger speed signals, determine a boost error based on actual and target boost values and deliver a responsive control signal; the controller including a processor, said processor determining the target boost value based on the speed, rack position and sensed barometric pressure signals, said processor selecting a boost value from a boost map and a boost offset value from a boost offset map, and combining said selected boost and offset boost values to determine said target boost value, said boost map value being a function of engine speed and rack position and said boost offset value being a function of engine speed and barometric pressure;

the controller being configured to compare said turbocharger speed to a predetermined threshold value and determine said control signal based on said comparison;

the controller being configured to determine whether the wastegate valve is operating properly; and an actuator for receiving said control signal, responsively moving said wastegate valve toward one of the open and closed positions, and to a position between the open and closed positions;

wherein the controller determines whether the wastegate valve is operating properly if the turbocharger speed is greater than the predetermined threshold value.

3. The control system of claim 2, wherein the controller delivers a signal to derate the engine if the controller determines that the wastegate valve is operating improperly.

4. A control system for controlling turbocharger boost pressure of an internal combustion engine at various different altitudes, said engine having an intake manifold and an exhaust manifold respectively connected to a compressor section and a turbine section of a turbocharger, comprising:

a wastegate valve connected between said exhaust manifold and said turbine section, said wastegate valve being movable between an open position at which fluid flow exhausted by the engine is free to bypass the turbine and a closed position at which fluid flow exhausted by the engine is restricted from bypassing the turbine;

a first sensor configured to sense a speed of the engine and deliver a responsive speed signal;

a second sensor configured to sense a boost pressure of the engine and deliver a responsive boost signal;

a third sensor configured to sense a rack position of the engine and deliver a responsive rack position signal;

a fourth sensor configured to sense a speed of the turbocharger and deliver a responsive turbocharger speed signal;

a controller connected to said first, second, third, and fourth sensors, the controller being configured to receive the speed, boost, rack position, and turbocharger speed signals, determine a boost error based on actual and target boost values and deliver a responsive control signal;

the controller including a processor, said processor determining the target boost value based on the speed, rack position, and sensed turbocharger speed signals, said processor selecting a boost value from a boost map and a boost offset value from a boost offset map, and combining said selected boost and offset boost values to determine said target boost value, said boost map value being a function of engine speed and rack position and said boost offset value being a function of engine speed and turbocharger speed; and an actuator for receiving said control signal, responsively moving said wastegate valve toward one of the open and closed positions, and to a position between the open and closed positions; and wherein the controller is configured to compare said turbocharger speed to a predetermined threshold value and determine said control signal based on said comparison; and wherein the controller determined whether the wastegate valve is operating properly if the turbocharger speed is greater than the predetermined threshold value.

5. The control system of claim 4, wherein the controller delivers a signal to derate the engine of if the controller determines that the wastegate valve is operating improperly.

* * * * *